United States Patent [19]

Anderson

[11] Patent Number: 4,834,878
[45] Date of Patent: May 30, 1989

[54] APPARATUS FOR SEPARATING LIQUID FROM SLUDGE

[76] Inventor: John W. Anderson, 403 Hidden Harbor, Houston, Tex. 77079

[21] Appl. No.: 167,783

[22] Filed: Mar. 14, 1988

Related U.S. Application Data

[63] Continuation-in-part of Ser. No. 854,900, Apr. 23, 1986, abandoned.

[51] Int. Cl.$^4$ .............................................. C02F 11/14
[52] U.S. Cl. ................................... 210/202; 210/208; 210/225; 210/251; 210/259; 210/297; 210/298; 210/391; 210/400
[58] Field of Search ............... 210/202, 208, 219, 225, 210/251, 254, 259, 262, 297, 298, 319, 320, 391, 394, 400–404, 409, 780, 784, 512.1

[56] References Cited

U.S. PATENT DOCUMENTS

| | | | |
|---|---|---|---|
| 3,170,388 | 2/1965 | Reichstein | 210/251 X |
| 3,475,178 | 10/1969 | Zebarth et al. | 210/784 X |
| 4,066,548 | 1/1978 | Olson et al. | 210/400 X |
| 4,105,558 | 8/1978 | Heinrich et al. | 210/202 X |
| 4,184,951 | 1/1980 | Wientjens | 210/784 X |
| 4,358,381 | 11/1982 | Takeuchi et al. | 210/401 X |
| 4,380,496 | 4/1983 | Maffet | 210/780 |
| 4,581,136 | 4/1986 | Saalasti | 210/251 X |
| 4,634,537 | 1/1987 | Schreiber | 210/784 |

Primary Examiner—Tom Wyse
Attorney, Agent, or Firm—Vaden, Eickenroht, Thompson & Boulware

[57] ABSTRACT

A system of continuously and efficiently separating liquid from sludge is disclosed which includes two parts, the mixer conditioner and the rotary drain. The two parts are virtually always used together. The mixer conditioner may include an adjacent vertical receiver which may serve to extend residence time. The receiver, if used, is connected at the bottom to the tangential inlet line to the mixer conditioner. This inlet line provides the means for circulation therethrough the watery sludge to which has been added a flocculant in a gentle manner so as to cause mixing while not causing shearing. A slow moving horizontal impeller operates to maintain the spiraling motion initiated at the tangential inlet. The outlet, also tangential, delivers to the rotary drain. The rotary drain is a compartmentalized cage that is decreasingly baffled from compartment to compartment. Each compartment is an individual cage with its own individual wire mesh, providing therein the means to easily vary the mesh or openness from cage to cage. The baffles are provided with adjustable ports to modify almost infinitely the number of changes that are possible internally and mechanically to maximize output quality independently of flow.

8 Claims, 2 Drawing Sheets

APPARATUS FOR SEPARATING LIQUID FROM SLUDGE

This application is a continuation-in-part of my co-pending patent application Ser. No. 06/854,900 filed Apr. 23, 1986 now abandoned.

BACKGROUND OF THE INVENTION

1. Field of the Invention

This invention pertains to the treatment of sludge and particularly to techniques for processing relatively large volumes of sludge initially containing a large percentage of liquid so as to quickly and efficiently remove a sufficiently large quantity of the liquid from the sludge to make the mostly liquid-free residue readily transportable.

2. Description of the Prior Art

In nearly every industrial and municipal wastewater treatment process, the need to thicken or consolidate waste solids in order to reduce their volume for economical disposal is one of ever increasing proportions. The need parallels the demands of a growing population for increased treatment capacity and better effluent quality.

Because waste solids, consolidated or otherwise, offer little potential for monetary return in the marketplace, great emphasis is placed on minimizing installation and operating costs of the necessary mechanical consolidation elements.

The art of solids-liquid separation finds application in thickening or consolidation of waste solids. In general though not all inclusive sense, this art is an expression of two technologies: chemical and mechanical.

Chemical contributions have been extensive. For centuries the utilitarian benefits of inorganic metallic salts or coagulants and flocculants have been known. Because of a lacking structural integrity of agglomerated particulate matter formed through their use, the physical methods employed to effect separations were limited in their effectiveness. The availability of high molecular weight organic polyelectrolytes (within the past 30 years) has been a beneficial development of genuine merit. The strength or integrity of agglomerated particulate matter developed through their use now permits the successful utilization of a variety of mechanical devices to assist in th physical aspects of separation. An understanding of the utility of high molecular weight polyelectrolytes can be appreciated from an appraisal of a typical waste sludge that is a thin, watery suspension of micro fine particulates, each carrying an electrical charge. Such particles, if under the influence of an electrical field and negatively charged, will migrate or be attracted to the cathode or positively charged electrode.

In the sludge, however, if there is nothing present to supply cations or positive charges and the sludge is anionic in general character, the particles try to stay independent and apart from each other. This system of repulsion forces may be compared to two magnets with like poles in proximity, repelling or pushing apart each from the other.

The infinite number of micro particles and the multiplicity of like and repelling charges sets up what is essentially a stable system of repulsion forces that prohibits significant natural thickening or consolidation beyond the range of 1-3% solids. Each sludge exhibits such behavior and it may reflect a preponderance of positive or negatively charged character depending on the program yielding the sludge.

The system of repulsion forces may be destabilized or in a sense neutralized by the mixing in of an additive that exhibits a character opposite to that reflected in the sludge. If, for example, the sludge is anionic in character, the use of a cationic additive is indicated and the quantity required is determined by the extent of the demand for th additive.

In a destabilized system or where, for example, a cationic demand has been neutralized with the use of an additive, the micro particles no longer repel each other and may adhere to each other on contact to form groups, with the groups so formed adhering to other groups to form larger groups to become visibly identifiable agglomerated matter referred to as "flocs". In addition to charge neutralization, the high molecular weight additives help provide strength to the developed flocs through a mechanism commonly referred to as "bridging". Thus, charge neutralization and bridging are believed to be the mechanisms through which flocculation can be made to occur.

Once the particulate matter in a sludge suspension has been properly neutralized and agglomerated through the means previously described, the usefulness of mechanical separation equipment becomes apparent.

All known processes that functionally assist solids-liquid separation operate using gravity, pressure, vacuum, centrifugal force, or a combination of these forces at either ambient or elevated temperatures.

Not necessarily in the order of their development, the list of known devices contributing to the artful science of solids-liquid separation include: batch type and continuous centrifuges, continuous vacuum filters of the rotary drum type, straight line traveling belt type, plate and frame batch type presses, rotary and straight line traveling belt draining devices, continuous belt presses, batch character sand bed filtration and drying beds, and more recently, vacuum assisted units of the same character. Also known are presses of the screw type and combinations of the various devices listed.

The processes listed have served usefully in the mechanics of separation. These and other contributions reflect progress in the areas of filtration, centrifugation, vacuum and pressure development.

However, it is apparent from the economics that it is highly desirable to accomplish more with each dollar invested in wastewater plants and process equipment. Government financial assistance is on the decline while demands for better effluent quality and increased throughput are constantly growing. Logically, the accomplishment of higher throughputs in any segment of plant operations benefits the entire operation. To do this in the solids-liquid separation area, on the basis of a low-to-negligible additional investment, must be well regarded as a beneficial improvement. The impact can be a positive one from one end of the plant to the other as bacterial population control or solids management is a key element of efficient operation. The system described herein is comprised of several parts, each of which includes novel features and which together provide a novel system.

The weaknesses or shortcomings of existing processes and equipment may be summarized as follows:

1. Preoccupation with the element of dryness:

Consider 100,000 gallons of 1% sludge. As is, this represents 833,000 pounds of material requiring disposal in order to remove the waste solids portion of 8,330 pounds of dry material. This means that 824,670 pounds of water must be disposed of in order to remove the 8,330 pounds of sludge. The water portion of this problem is 99%.

Assume, for purposes of understanding, what the situation looks like if the sludge is converted to 20% material—a figure that is desirable in terms of dryness but one which in reality, is seldom, if ever, reached in actual continuous process equipment.

The disposal problem has been reduced from 833,000 pounds to 41,650 pounds. The dry solids portion is still 8,330 pounds. 791,350 pounds of water are no longer part of the disposal problem. It is simply returned as harmless water to the plant circuitry. 95% of the free water has been removed.

If, on the other hand, 15% solids is the figure reached through consolidation, the disposal problem has been reduced from 833,000 pounds to 55,533 pounds, leaving 777,467 pounds of water for return to the plant. This means that 93.3% of the free water has been removed.

The difference is a relative insignificant 1.7% of the available free water and the importance of getting this small extra percentage has been vastly overemphasized. The cost to accomplish this is, and has been, exorbitant. For example, a continuous belt press, sized with a 1.5 meter belt width will be capable of processing approximately 70 gpm of sludge, and may, under good operating conditions, produce a cake with 20% solids. Of the continuous processes available today, the belt presses are the only units that approach 20% output solids. With the auxiliary equipment required to make it operational, such a unit as has just been described, will represent a capital investment exceeding $200,000. This figure represents a cost of $2,857 per gallon of throughput capacity. Suppose then, because of a new approach, it were possible to push 300 gallons per minute through a unit that costs the same $200,000 but was only capable of reaching 15% solids. This would reduce the cost per gallon throughput to $666. It would seem that the 1.7% extra water removed would truly take on the character of an unimportant matter in view of the saving. This is what can be accomplished with technique described herein when used in conjunction with finishing pressure elements.

2. Throughput limitations:

This topic is interrelated to topic 1 above. The system described herein increases throughput compared to prior art systems, making one unit serve the purpose of several. Moreover, the system herein yields cost effectiveness and reduces cost of operation because each man hour serves more usefully and chemical usage has been minimized.

3. Application inflexibility:

Trying to get existing equipment into a specific thickening mode of operation is very difficult, that is, where the output can be controlled in the 5-7% solids range. The apparatus described herein, however, is designed to serve efficiently in this output solids range in addition to the dewatering solids range of 14-15%, when used in conjunction with finishing pressure elements.

4. Operational complexity:

Much of the equipment on the market today is entirely too complicated. That is, it is too complicated for the average operator and too complicated and time consuming in repairs. The apparatus described herein is so simple, so easy to operate, so simple to maintain and repair, that it will set a new standard for simplicity in such matters.

5. High utility requirements:

The requirements for water and power of the known processes exceed 60 amps and 50 gallons per minute, respectively. The system described below utilizes approximately 30 amps for power and 8 gallons per minute for water.

Hence, it is a primary feature of this invention to focus attention on the peculiar properties of those chemical additives known as polymers or high molecular weight polyelectrolytes, the use of which made accelerated solids-liquid separations possible, and to provide a process that uniquely takes advantage of these properties.

It is another feature of this invention to provide an improved process, consistent with the above, that will result in lower operating costs, higher throughputs, operational simplicity, and lower utility requirements when compared to other processes known at this time.

It is a further feature of this invention to provide applications flexibility; that is, to provide simple adaptability to what is commonly known as a "thickening" operation where output solids are expected to be in the 5-7% range, or a "dewatering" operation where output solids are expected to be in the 15% range, when used in conjunction with finishing pressure elements such as auger presses, centrifuges and/or belt presses.

Especially with regard to the first feature set forth above, lip service appears to be the extent of attention to date to the process of "mixing". Numerous references are made to this subject in earlier patents with such profound comments as "mixing shall be by suitable means" without providing any parameter or guidelines to such mixing.

Mixing of a sludge with a coagulant or flocculant, to the contrary, is the basis of a successful separation experience. The benefits of attention to the intensity and mechanical aspects of mixing can result in a number of operational dividends. In a controlled mixing environment, even to an untrained observer, it is simple to determine when the proper amount of chemical has been added. Consequently, it is easily determined when too much has been added, and excessive chemical usage can be avoided.

Excessive chemical usage should be avoided for two reasons. First, it is expensive and bears heavily on the overall cost of solids-liquid separation. In every plant, this is a persistent target in efforts to economize. Secondly, an overuse of chemical hinders the drainage rate and is counterproductive to the purpose of the chemical use.

Shear, or destructive forces should be avoided if at all possible. If they are not avoided, these forces will service to destroy or harm or break down the floc-like agglomerates once formed, the formation of which was the intended purpose in the first place.

Anything like a propeller running at high speed, a baffle against which the agglomerated matter might crash, sudden directional changes in flow, vertical and at the same time horizontal impetus all serve to simply frustrate the intended use of the chemical. The purpose of purely mixing may be served by such means to be sure, but always an extra price will be extracted in the form of extra chemical to toughen the agglomerates and make them more resistant to the effects of such abuse.

It is pure, indisputable logic in the pursuit of both efficiency and economy, therefore, to address mixing as the starting matter of dominant importance or the foundation on which everything must depend. This may be demonstrated by considering the abusive extreme of mixing chemical and sludge in a blender. They certainly would be "mixed" everyone would agree. But, if the purpose of the mixing is separation of the contained solids, the purpose would be completely frustrated. Nearly every manufacturer of equipment on the market today considers this matter lightly, as of no major importance, requiring attention in a secondary fashion or a bridge to be crossed when it becomes a problem.

SUMMARY OF THE INVENTION

Full realization of the features outlined above and utilization of the invention to its maximum potential requires careful attention to the selection of a polyelectrolyte employed to effect coagulation of the particulate matter.

Following this, in a preferred embodiment, the chemical is added in line to the thin watery sludge or suspension of particulate matter, in proximity to the mixer receiving chamber which is attached tangentially to the mixer conditioner tank. The receiving chamber is open to the atmosphere at the top permitting the controlled flow of treated sludge to be delivered on the surface, under atmospheric conditions, near the top, of the receiving chamber. The mixture, free of disturbing influences other than the gravitational force of the delivered flow, moves downwardly through the vertical receiving chamber to the bottom of the chamber. There is an opening or port connecting the receiving chamber tangential to the mixing conditioner chamber located in the sidewall between the two chambers at the lowest possible level. The mixture, under the hydraulic force of the flow behind it, moves into the area of mixing influence, at a point on the circumference and tangential to the conditioner chamber at the lowest level.

The flow, now under the influence of mixing, moves around in a circular, unrestricted, gentle and slowly rising fashion to the tangential discharge pipe through which the fully flocculated and agglomerated particulate matter delivers by gravity into the rotary drain device.

The conditioner vessel of the mixer is cylindrical and baffle free. Material enters at tangent at the bottom and exits at a tangent near the top. Mixing duration is less than one minute. The mixer is a simple perpendicular paddle or a series of paddles that cause a swirling of the mixer contents, moving to within three inches of the mixer cylinder wall, through a variable speed control, only fast enough to prevent any evidence of flow short circuiting, when viewed through the open top of the mixer's conditioner vessel.

At a standard flow, once established, the character and size of the finished flocs become fairly uniform, contributing to the release and drainage of liquid within the confines of the rotary drain device.

Delivery of flocculated matter to the receiving section of a meshed, caged rotary drain device is by way of gravity flow from the mixing chamber. Again, every effort is made to minimize shear or the destruction of the newly formed flocs by a smooth, unrestricted, gentle transmission line, having a 90° bend, with the delivery end slightly lower than the transmission line and to the left in a preferred embodiment when viewed from the mixer toward the rotary drain device. In the preferred embodiment, the rotary motion is counterclockwise when the rotary drain device is viewed from its input end. Delivery of the mixer output flows gently onto the first section drainage surface.

The water or liquid portion of the mixture begins immediately to drain away as the rotary motion of the unit causes the conditioned solids to roll and accumulate until the mass exceeds the capacity of the receiving section of the rotary drain device, at which point a portion will spill over the wall of a transverse baffle right into the next section of the rotary drain device. Here, the porosity of the media increases, or decreases depending on the need for increased drainage or improved solids retention.

This process continues in the same fashion through each sequential section or chamber, capitalizing on the manually operated port adjustments to maximize desired results.

The baffle detention rings separating the various sections of the rotary drain device each contains a number of ports equipped with adjustable vanes to provide the flexibility of unlimited internal adjustment to achieve highly efficient performance under widely varying conditions.

The woven fabric or wire mesh draining media of the sectionized rotary drain device must not be allowed to blind or foul with fine particulate matter. It is kept open and clean to maximize the draining potential by means of either a continuous wash or a variable, sequential, high pressure, washing system that requires no more than eight gallons of water per minute.

This is the complete process if thickening or limited solids-liquid separation is desired. The throughput flow may be as much as 300 gallons per minute, 2% solids. Consolidation through the rotary drain device may be adjusted to yield 5% to 9% solids. If higher solids (up to 15%) are desired, the unit may be used preceding auger presses, belt presses, centrifuges or natural draining devices. In the drawings two finishing elements have been designed to receive the output of the rotary drain device.

The first is a variable speed draining auger which, in use, develops an element of limited pressure to produce output solids in the range of 13%.

The second may be substituted for the auger press to yield solids in the 14% range or in conjunction with and receiving the output of the auger press to produce solids in the range of 16%. It is essentially a simple pugging and roller press that eliminates the common complexities of known belt presses but operates in a similar manner.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereto which are illustrated in the drawings, which drawings form a part of this specification. It is to be noted, however, that the appended drawings illustrate only preferred embodiments of the invention and are, therefore, not to be considered limiting of its scope for the invention may admit to other equally effective embodiments.

In the Drawings

DESCRIPTION OF THE PREFERRED EMBODIMENT

Figure 1:
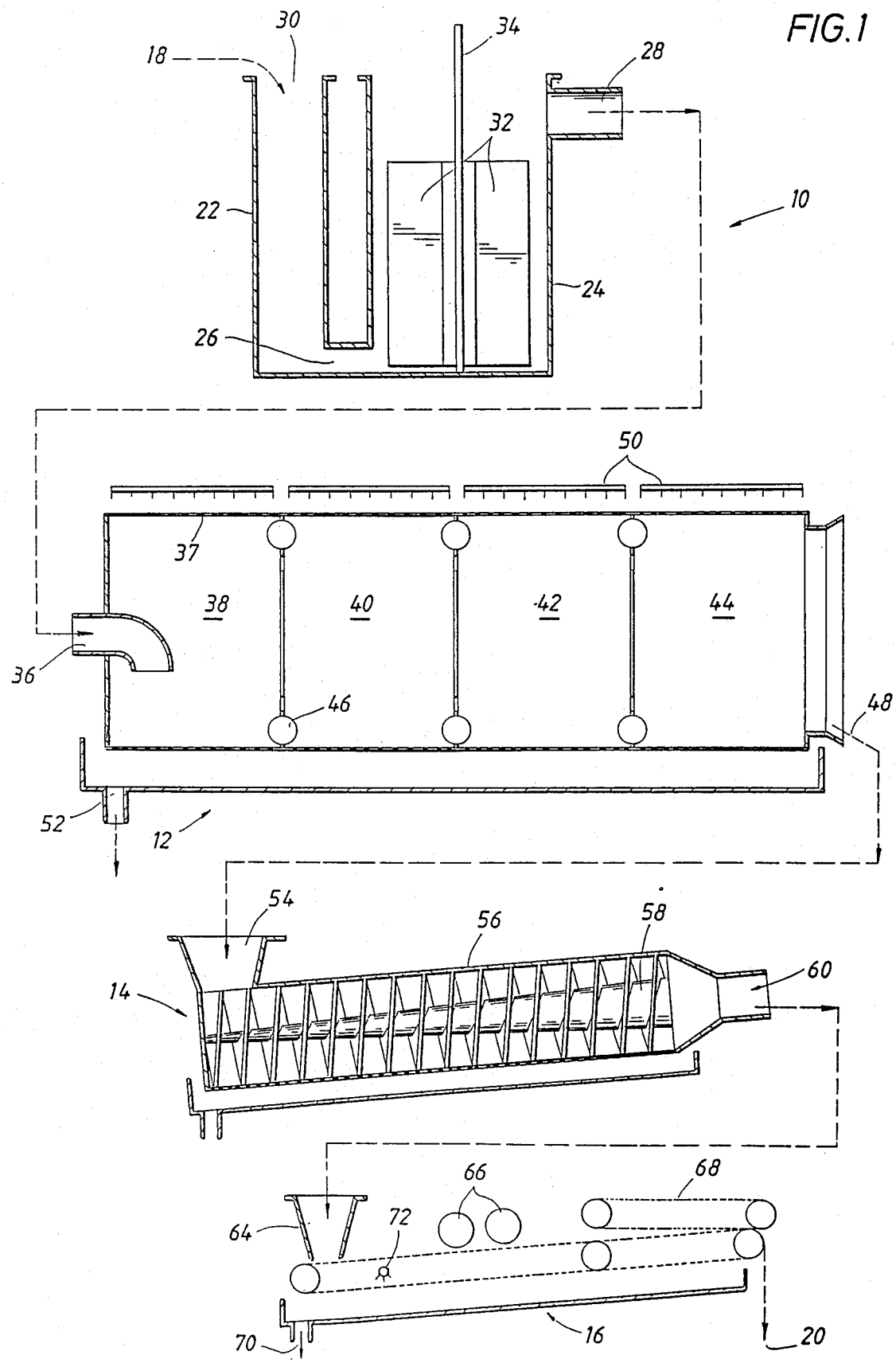
FIG. 1 is a plan view of a complete liquid-and-solids separation system in accordance with the present invention used in conjunction with an auger press or a belt press.

Now referring to the drawings and first to FIG. 1, a plan view of a complete separation system is illustrated showing from top to bottom, a mix conditioner apparatus 10, a rotary drain apparatus 12, an auger press apparatus 14 and a belt press apparatus 16. Each of these apparatuses can be used separately and can be combined into a system not including each of the other of the four individual apparatuses, if desired. However, in the configuration shown, the introduced liquid-and-solids sludge is typically only about 2% solids. Each part of the illustrated system beneficially treats the incoming liquids and solids for subsequent handling and further treatment as the sludge progresses through all four parts.

The flow of consolidating solids may be traced by following the dotted line int he drawing from input 18 to the mix conditioner, the point where conditioned liquids-and-solids slurry is delivered to the processing equipment, to output 20, the point where the most concentrated solids are discharged. Suitable flocculant has already been added prior to input 18, as explained more fully in conjunction with the detailed description of the mix conditioner below. The mix conditioner is comprised of receiving chamber 22, the mixing conditioner chamber 24, port 26 connecting the two chambers, and mixer discharge port 28. Chemically conditioned slurry enters the receiver chamber of the mixer at its open end 30 and encounters the force of the mixing element 32 after passing into the conditioner from the receiving chamber through port 26. Mixing element 32 is preferably one or two horizontally acting impeller blades. The rotation driving force is transmitted to the mixing element through the drive shaft 34, which is preferably driven by a source (no shown) capable of variable speed and energy operation.

Fully flocculated material leaves the mixer at port 28 for gravity delivery to entrance inlet 36 to the first section of chamber 38 of rotary drain apparatus 12, which is generally cage-like in appearance. This is where consolidation of the solids begins. Consolidation proceeds through chambers 40, 42 and 44 of the rotary drain apparatus. The porosity of the draining media covering the side walls 37 of the cage differs through each succeeding chamber, from 38 through 44, suggesting in an embodiment where the mesh increases through each succeeding chamber, increased and accelerated draining slowly in chamber 38, faster in chamber 40, still faster in chamber 42 and even faster in chamber 44. As consolidation progresses from chamber 38 through 44, the solids become resistant to passage through the draining media and are retained as part of the moving mass even though the porosity varies from chamber to chamber as indicated.

As described more fully below in connection with the detailed description of the rotary drain apparatus, a key structural feature in the baffle walls separating the chambers of the rotary drain apparatus is represented by circles, one of which is numbered 46. This represents one of several, per baffle wall, adjustable vane-equipped ports which permits passage from one section to the next as the solids mass becomes greater. These vaned, adjustable ports may provide a reverse resistance to the normally patterned flow, to interfere with it, or to accelerate it, as selected by the operator. These adjustable ports provide the comprehensive means of controlling detention which, in turn, provides output solids quality control. The consolidated solids deliquified by the rotary drain apparatus leaves at output 48.

The continuous or adjustable, sequential, high pressure wash system which restricts the consumption of wash water to eight gallons per minute is indicated by spray heads 50. These spray heads serve to keep the draining media free of blinding fines and open to serve the draining purpose. Drain 52 indicates the discharge point for rotary drain liquid.

Output of the rotary drain apparatus can, in the interest of developing higher solids, be directed to an auger press element designed to accommodate the rotary drain sludge output. The receiver hopper 54 of such an auger press permits access to the pressure developing auger contained in a cage-like draining housing 56. The pressure developing element is reflected in the progressive increase in the diameter of shaft 58, which forces the throughput into a progressively reduced volume. Other means can be provided to develop such pressure. The output of the auger press is indicated at outlet 60.

How the invention works with finishing elements utilizing pressure may be characterized by the following example. The moisture content can be further reduced by utilization of a higher pressure finishing apparatus, viz., a roller press element 16, characterized in part by an endless belt of woven fabric or wire mesh 62. The receiving hopper for such a belt is denoted as numberal 64. Numeral 66 denotes pugging rollers, which shock extra moisture from the mass and arrange it to feed smoothly into the influence of the pressure area regulated by belt 68, the belt that imposes regulated pressure on the lower belt transporting the mass of the consolidating solids. It should be noted that belt 69 is at a decreasing angle to belt 62 and therefore increasingly compacts or presses the solids as they pass through the apparatus. Numeral 20 is the point of discharge for the consolidated solids. Drainage water is collected and discharged at outlet 70.

Spray head 72 located within belt 62 for spraying outwardly through the next, washes the woven fabric or wire mesh of the belt. Washing serves to keep the mesh open to permit maximum pressurized drainage.

Figure 2:
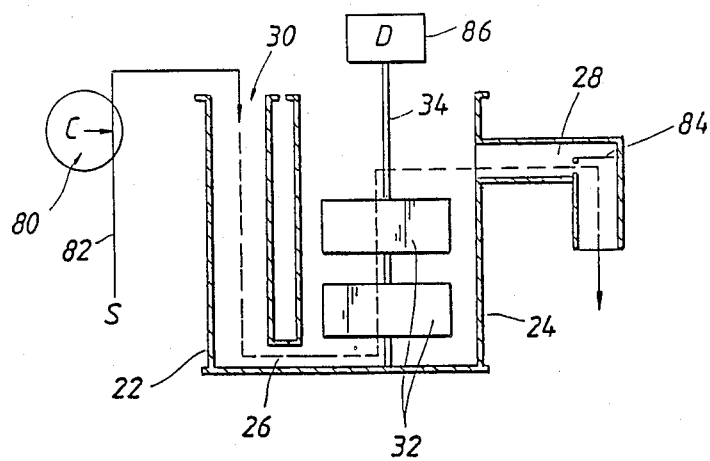
FIG. 2 is a plan view of the mix conditioner part of the separation system shown in FIG. 1.

Now referring to FIG. 2, mixer conditioner 10 will be discussed more in detail. Generally, the mixer conditioner provides (1) an operational, visual control point where chemically treated liquids-and-solids sludge enters the apparatus and thereby permits the operator to determine the need for treatment adjustments and, once made, to quickly evaluate the usefulness of such adjustments, (2) gentle, thorough and shear-free conditioning, and (3) brief, short-circuit free, detention.

The mixer conditioner apparatus may be considered to be included in a large vertical, cylindrical tank or conditioner 24. Attached tangentially thereto may be a smaller vertical chamber characterized as a receiver 22, which may be cylindrical or otherwise. Both receiver 22 and conditioner 24 are opened at their respective top ends and are openly connected to each other at port 26, tangentially to the conditioner, at their bottom ends so that material from receiver 22 can pass therethrough to the conditioner. Preferably this port introduces the material tangentially to the rotating motion of the impeller blade or blades discussed below.

The mixing of chemicals C, which are flocculant chemicals suitable for coating with sludge S in question, as discussed above, occurs in a mixing tee valve 80 with the incoming liquids-and-solids sludge at a point in vertical line 82 immediately preceding delivery into open receiver 22. Mixing tee valve 80 preferably includes a quill for the injection of suitable chemicals. Following two elbow turns, the treated liquids-and-solids sludge falls into open top end 30 of receiver 22.

An opening or port 26 connects receiver 22 and conditioner 24 through the sidewall of each near their respective bottoms and tangential to the conditioner to permit the unrestricted flow of the chemically treated liquids-and-solids sludge from the receiver to the lowest level of the conditioner. Once inside conditioner 24, the sludge encounters the gentle swirling motion of the conditioner impeller blade or blades 32. The material rises as it is stirred to the level of th tangential overflow discharge pipe 28, which level is below the level of the open end of receiver 22 and conditioner 24. Coagulated and conditioned sludge exits the conditioner to be introduced into the rotary drain apparatus by gravity feed. Deflector plates 84 attached to the discharge pipe can be provided to further minimize abuse to the coagulated sludge associated with the flow. Alternatively, discharge pipe 28 can be positioned and shaped for smooth tangential discharge of the sludge from the conditioner. This can be provided by a gentle elbow bend in the direction of flow takeoff of the material.

As mentioned above, the receiver is open for the acceptance of the liquids-and-solids sludge just after the chemical additives have been added to it. The open vessel provides a control point for treatment appraisal and visual inspection. If the material changes in appearance, the chemical-to-sludge control can be varied to change the ratio of flocculant to sludge. In addition, additional chemicals can be fed into the open end for further treatment, if desired. It should be noted that there is an acceptable quantity range for the chemical. Too little or too much will not result in proper treatment. The most economic operation is at the low end of the acceptable range.

The conditioner drive unit 86 attached to the centally positioned vertical drive shaft 34 connected to the impeller blades is preferably a fractional horsepower device. As noted, the impeller may be a single blade or multiple blades and may be at different radial positions or may be stacked, as desired. In any event, the impelling surface or surfaces are parallel to the shaft. By this arrangement, a simple horizontal swirling motion is imparted to the rising material and no mechanical vertical impetus is provided.

The moving sludge is in detention in the conditioner less than a minute for a system designed to accept a 2% solids, liquids-and-solids sludge at a rate of 300 gallons per minute. In a system designed to utilize the principles of operation just described, the receiver volume was less than 20% of the conditioner volume, thereby minimizing receiver detention of the treated, but not-stirred material.

Figure 3:
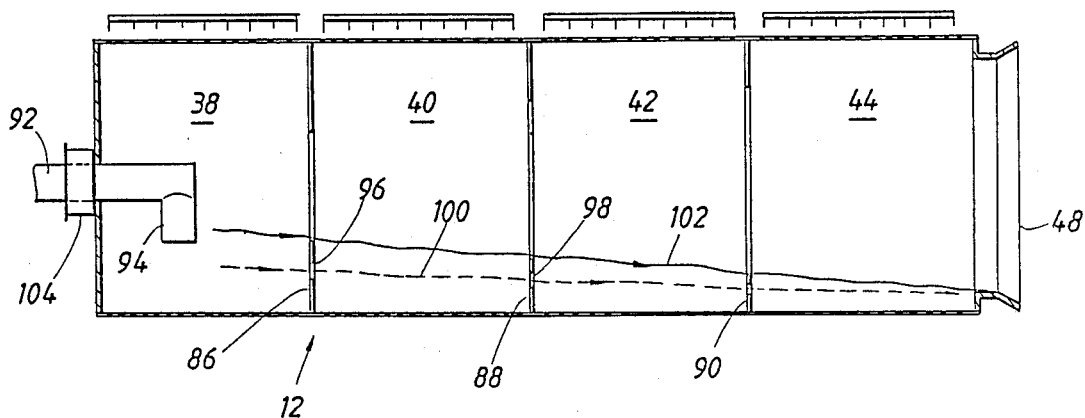
FIG. 3 is a plan view of the rotary drain part of the separation system shown in FIG. 1.

Now referring to FIG. 3, rotary drain apparatus 12 will be discussed in more detail. Generally, the rotary drain apparatus contributes to overall efficiency by (1) exposing incoming conditioned sludge to between 1200 and 3000 square feet per minute of drainage surface at the rate of feed into the mixer conditioner noted above, whereby the outfall sludge volume is consolidated or reduced 15%–20% of the incoming volume, (2) restricting the counter-drainage wash water to 8 gallons per minute for the amount of material indicated above, and (3) providing for increased and/or decreased detention for a constant flow so as to regulate dewatering or thickening or to assist in managing sludges exhibiting treatability problems.

Rotary drain apparatus for treating the volume of material indicated above has been constructed in th form of a cage-like device that is 48″ in diameter and 12′ long. The cage is aligned for horizontal rotation and is supported and rotated by rollers (not shown) located at each end one or more points in between. The rotary cage can be covered with wire mesh of fine stainless steel wire, although as is noted below the porosity of the mesh is preferably varied to improve detention from its input end to its output end. The drive sprocket (not shown) is attached to the input end of the cage.

Lengthwise the cage is divided into a plurality of chambers depicted here as 38, 40, 42 and 44 by circular, vertical baffle plates 86, 88 and 90, respectively. These plates not only determine the compartments or chambers, but also provide integrity to the structure. The plates present a barrier level to the sludge material as it advances from the entrance or receiving end on the left to the delivery end on the right. In one embodiment, this level changes from 9 inches as provided by the central opening in baffle plate 96 to $2\frac{1}{4}$ inches as provided by the central opening in baffle plate 90. Ports in some or all of the barrier walls provide further control of the rate of advance from chamber to chamber, as discussed more fully below. In fact, such ports can be provided in baffle plates of uniform height dimension so that the amount of opening of the respective ports in the respective baffles alone determines the amount of flow from chamber to chamber. External longitudinal stringers are provided to hold the assembly together lengthwise.

The entrance inlet 92 into chamber 38 gravity discharges through a downspout 94 the entering material which builds up in chamber 38 until it dumps over barrier 86 or delivers to the next chamber partly or entirely by way of the adjustable ports. This action continues until the drained material exits chamber 44 through delivery end 48 of the cage. It should be noted in this embodiment that the bottom of the opening of the delivery end is below the level of barrier 90 and the height of barrier 90 is less than the height of barrier 88. Barrier 88 is not as high as barrier 86 and barrier 86 is not as high as the output from downspout 94 so that gravity feed of the solids material is provided from chamber to chamber.

Ports 96 and 98 are respectively provided in baffle plates 86 and 88, at a plurality of opposite radial locates. These ports can be opened or partly opened to decrease detention of the draining sludge through the apparatus in the thickening mode of the operation 100. These ports can be closed or partly closed to maximize detention in the dewatering mode of operation 102. Gates can be substituted for vane-regulated ports in the baffle plates, if desired. Moreover, as previously mentioned, it is possible to rely solely on such ports and not partly on the varying height of the baffles, if desired.

External spray heads 50 are provided along the external surface of the mesh to cleanse the mesh of clogged material. For the volume of material discussed above, using the sequential wash system only 8 gallons of water per minute at about 200 psi of delivered pressure is required to keep the wire mesh open and clean. A variable pressure source connected for providing this wash water is desirable. Operation is preferable sequential wherein the spray heads opposite the first chamber are turned on, then they are turned off while the spray heads opposite the second chamber are turned on and so on until all of the chambers are washed. The sequence is then repeated.

The drive for rotating the cage is a 1.2 horsepower variable speed chain drive transmitted through sprocket 104 mounted on the input end.

A preferred cage includes a mesh that is not a constant size mesh but varies from chamber to chamber and for example, increases in mesh size so that chamber 40 is more porous than chamber 38, chamber 42 is more porous than chamber 40 and chamber 44 is more porous than chamber 42.

Depending on the mode of operation, thickening or dewater, the auger apparatus serves a vital function in the solids-liquids separation process. In general the purposes of the auger press are (1) additional water removal and (2) transport. In the thickening mode of operation, output solids are increased 1%–2% over the output of the rotary drain apparatus. In the dewatering mode of operation, output solids are increased 1%–2% over the output of the rotary drain apparatus. In the dewatering mode of operation, solids increase over the rotary drain apparatus is between 3%–4%. High pressure augers can be provided to increase the solids to 14%–15%.

Figure 4:
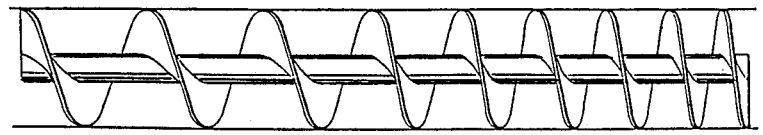
FIG. 4 is a plan view of a first embodiment of the auger press part of the separation system shown in FIG. 1.
Figure 5:
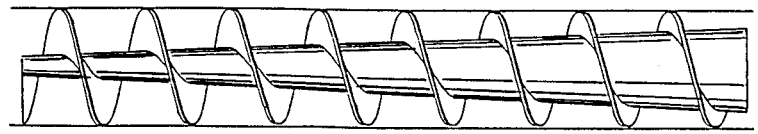
FIG. 5 is a plan view of a second embodiment of the auger press part of the separation system shown in FIG. 1.

For the volume discussed above, the auger housing is a flanged cage fabricated from stainless steel plate with $\frac{3}{4}''$ square openings with the open side area exceeding 40% on the bottom side of the auger cage. The open side of the auger cage is preferably covered with 60 mesh stainless steel. The auger flight edging is polypropylene. The pitch on the flights of auger 14A shown in FIG. 4 is $\frac{3}{8}$ in the receiving area and $\frac{1}{2}$ in the latter area for pressure build up purposes. Alternatively, as shown i FIG. 5, pressure build up can be provided for an auger of uniform flight dimension by increasing the diameter of the auger shaft from flight to flight.

The drive on the auger shaft is 2 horsepower, with rpm reduction to 100. Preferably, the rpm's are controllably variable with a variable speed reduction drive or by sheave replacement. The auger and housing diameters can be increased to reduce as desired the rpm's for a slower rate of production.

The 60 mesh stainless steel drainage housing liner wire is relatively self-cleaning. The pressure on the advancing sludge mass forces a persistent "weep" of water and micro sludge solids. This weeping keeps the mesh pores open. The weep solids can be returned to the mix conditioner described above to minimize return solids.

As explained above in FIG. 1, a belt press can be utilized in an overall system following the auger press, if desired. Alternatively, a belt press can be used alone and instead of an auger press, if desired.

While particular embodiments of the invention have been shown and described, and modifications or alternatives have been discussed, it will be understood that the invention is not limited thereto since modifications can be made and will become apparent to those skilled in the art. It may be desirable, for instance, not to use a receiver at all in the mix conditioner apparatus. That is, the sludge with chemicals added would then be introduced tangentially into the bottom of a conditioner without first settling in a receiver.

What is claimed is:

1. An apparatus for separating liquid from a liquid-and-solids sludge, comprising
a mix conditioner, including
   a vertical conditioner having a tangential bottom opening for receiving a mixture of liquid-and-solids-sludge and flocculant, and
   at least one impeller blade operating in said conditioner and rotating at least approximately horizontally so as to gently mix said entering liquids-and-solids-sludge and flocculant as the resulting mixture of flocculated liquid-laden sludge rises in said conditioner without causing shearing, said conditioner including a tangential overflow outlet at a vertical location above said impeller blade and below the top of said vertical conditioner from which said mixture of flocculated liquid-laden sludge pours, and
a rotary drain apparatus for receiving the overflow flocculated liquid-laden sludge from said overflow outlet of said mix conditioner, said rotary drain apparatus including
   an elongated, cylindrical, substantially open-sided unitized cage, said unitized cage comprising a plurality of individual cages, said unitized cage being mounted for substantially horizontal rotation, said individual cages being covered with various mesh medias through which liquid drains from the flocculated liquid-laden sludge as it progresses through said cage, said unitized cage having a small entrance inlet at the entrance end for the introduction of the flocculated liquid-laden sludge from said mix conditioner and a large delivery outlet at the delivery end, the bottom of said delivery outlet being lower than the bottom of said entrance inlet, and
   a plurality of internal vertical baffles located within said unitized cage to create a plurality of sequential chambers.

2. An apparatus for separating liquid from a liquid-and-solids sludge in accordance with claim 1, wherein said mix conditioner includes a vertical receiver for receiving the mixture of liquid-and-solids sludge and flocculant at a top entrance, said vertical receiver and said vertical conditioner being connected through respective openings at their bottoms, the opening of said mix conditioner being tangential thereto.

3. An apparatus for separating liquid from a liquid-and-solids sludge in accordance with claim 1, wherein said baffles include a plurality of sequentially adjustable opening means for permitting a change in detention and shearing of sludge in said chambers.

4. An apparatus for separating liquid from a liquid-and-solids sludge in accordance with claim 1, and including
an auger press for receiving the partially deliquified sludge from the delivery outlet of said first-named cage of said rotary drain apparatus,
   including a second elongated cylindrical cage having side openings in excess of 40% of its side area, said cage opening at its entrance end to receive said partially deliquified sludge for said rotary drain apparatus, and an auger operating within said second cage for advancing said introduced partially deliquified sludge toward the exit end of said second cage, the volume between flights in the auger being less at its exit end than at its entrance end.

5. An apparatus for separating liquid from liquid-and-solids sludge in accordance with claim 4, and including roller press apparatus for receiving the deliquified sludge from said auger press including, a continuously moving endless mesh media belt for receiving said deliquified sludge at its entrance end and depositing much drier sludge at its exit end, and press means operating in connection with the surface of said endless belt to squeeze liquid from said nearly deliquified sludge.

6. The apparatus in accordance with claim 5, wherein said press means includes sequentially pugging rollers and regulated pressure belt means.

7. The apparatus in accordance with claim 6, and including outwardly directed spray means for washing cake buildup out of the mesh openings of said endless belt.

8. An apparatus for separating liquid from liquid-and-solids sludge in accordance with claim 1, and including roller press apparatus for receiving the deliquified sludge from said rotary drain apparatus, including a continuously moving endless mesh media belt for receiving said deliquified sludge at its entrance end and depositing much drier sludge at its exit end, and press means operating in connection with the surface of said endless belt to squeeze liquid from said deliquified sludge.

* * * * *